US012799872B2

(12) United States Patent
Trivedi et al.

(10) Patent No.: US 12,799,872 B2

(45) Date of Patent: Nov. 17, 2026

(54) SEAL ASSEMBLY HAVING AT LEAST ONE DAMPING ELEMENT

(71) Applicant: General Electric Company, Schenectady, NY (US)

(72) Inventors: Deepak Trivedi, Halfmoon, NY (US); Rahul Anil Bidkar, Clifton Park, NY (US); Bugra Han Ertas, Niskayuna, NY (US); Ravindra Shankar Ganiger, Bengaluru (IN); Narendra Anand Hardikar, Bengaluru (IN)

(73) Assignee: GENERAL ELECTRIC COMPANY, Evendale, OH (US)

(*) Notice: Subject to any disclaimer, the term of this patent is extended or adjusted under 35 U.S.C. 154(b) by 210 days.

(21) Appl. No.: 18/536,843

(22) Filed: Dec. 12, 2023

(65) Prior Publication Data

US 2025/0035005 A1 Jan. 30, 2025

(30) Foreign Application Priority Data

Jul. 24, 2023 (IN) ............................. 202311049688

(51) Int. Cl.

*F16J 15/36* (2006.01)
*F01D 11/00* (2006.01)
*F01D 25/04* (2006.01)

(52) U.S. Cl.

CPC ............ *F01D 11/003* (2013.01); *F01D 25/04* (2013.01); *F16J 15/36* (2013.01); *F05D 2220/32* (2013.01); *F05D 2240/55* (2013.01); *F16J 15/363* (2013.01)

(58) Field of Classification Search

CPC ...... F16J 15/34; F16J 15/3464; F16J 15/3472; F16J 15/3476; F16J 15/366; F01D 11/003; F01D 25/04; F05D 2220/32; F05D 2240/55

See application file for complete search history.

(56) References Cited

U.S. PATENT DOCUMENTS 3,372,939 A * 3/1968 Coulombe ............... F16J 15/36 277/916
6,311,983 B1 * 11/2001 Burcham ................. F16J 15/44 415/113
9,010,764 B2 * 4/2015 Hoffmann ............ F16J 15/3476 277/377
9,255,642 B2 2/2016 Bidkar et al.

(Continued)

*Primary Examiner* — Christine M Mills
*Assistant Examiner* — L. Susmitha Koneru
(74) *Attorney, Agent, or Firm* — Venable LLP; Andrew W. Bradshaw; Michele V. Frank

(57) ABSTRACT

A seal assembly for a turbomachine includes a rotating component, a non-rotating component having a ring carrier, a face seal ring, and a joint disposed between the ring carrier and the non-rotating component. The non-rotating component is arranged with the rotating component at a sealing interface. The joint is capable of linear and tilt displacement to allow the non-rotating component to displace with respect to the rotating component. The sealing interface defines a gap between the face seal ring and the rotating component. The seal assembly also includes at least one damping element arranged with the ring carrier for maintaining the seal assembly centrally in a radial direction in the turbomachine. Further, the damping element(s) includes at least one mass element.

20 Claims, 11 Drawing Sheets

(56) References Cited

U.S. PATENT DOCUMENTS

| | | | | |
|---|---|---|---|---|
| 9,611,749 | B2 | 4/2017 | Thatte et al. | |
| 2014/0159317 | A1* | 6/2014 | Jahn | F16J 15/3468 277/411 |
| 2015/0275684 | A1 | 10/2015 | Thatte et al. | |
| 2018/0003069 | A1 | 1/2018 | Bidkar et al. | |
| 2018/0306061 | A1* | 10/2018 | Husband | F16C 27/02 |
| 2020/0011425 | A1* | 1/2020 | Tokunaga | F16J 15/3432 |
| 2020/0166143 | A1* | 5/2020 | Tran | F16J 15/40 |
| 2023/0407762 | A1* | 12/2023 | Hopper | F01D 11/025 |

* cited by examiner

SEAL ASSEMBLY HAVING AT LEAST ONE DAMPING ELEMENT

PRIORITY INFORMATION

The present application claims priority to Indian Patent Application Serial Number 202311049688 filed on Jul. 24, 2023.

FIELD

The present disclosure relates generally to turbomachines, and more particularly, to seal assemblies, such as face seal rings, having at least one damping element for reducing radial vibrations of the turbomachine.

BACKGROUND

Turbomachines include compressors and/or turbines, such as gas turbines, steam turbines, and hydraulic turbines. Generally, turbomachines include a rotor, which may be a shaft or drum, which supports turbomachine blades and a stator. For example, the turbomachine blades may be arranged in stages along the rotor of the turbomachine. The turbomachine may further include various seals to reduce or block flow (e.g., working fluid flow) leakage between various components of the turbomachine. For example, the turbomachine may include one or more face seal rings configured to reduce or block flow leakage between the shaft (e.g., rotating shaft) and a housing of the turbomachine.

However, it can be difficult to design a seal where the center of fluid pressure always passes through the geometrical center of the seal. Therefore, there is usually a pressure moment coupling between radial and axial vibrations of the seal. The presence of radial vibrations of the stator can cause significant reduction in the axial gap between the rotor and the seal, including catastrophic rubs. High seal response amplitude also adds to wear at interfaces, that limits the useful life of the seal.

BRIEF DESCRIPTION OF THE DRAWINGS

A full and enabling disclosure, including the best mode thereof, directed to one of ordinary skill in the art, is set forth in the specification, which refers to the appended Figures, in which.

Figure 1:
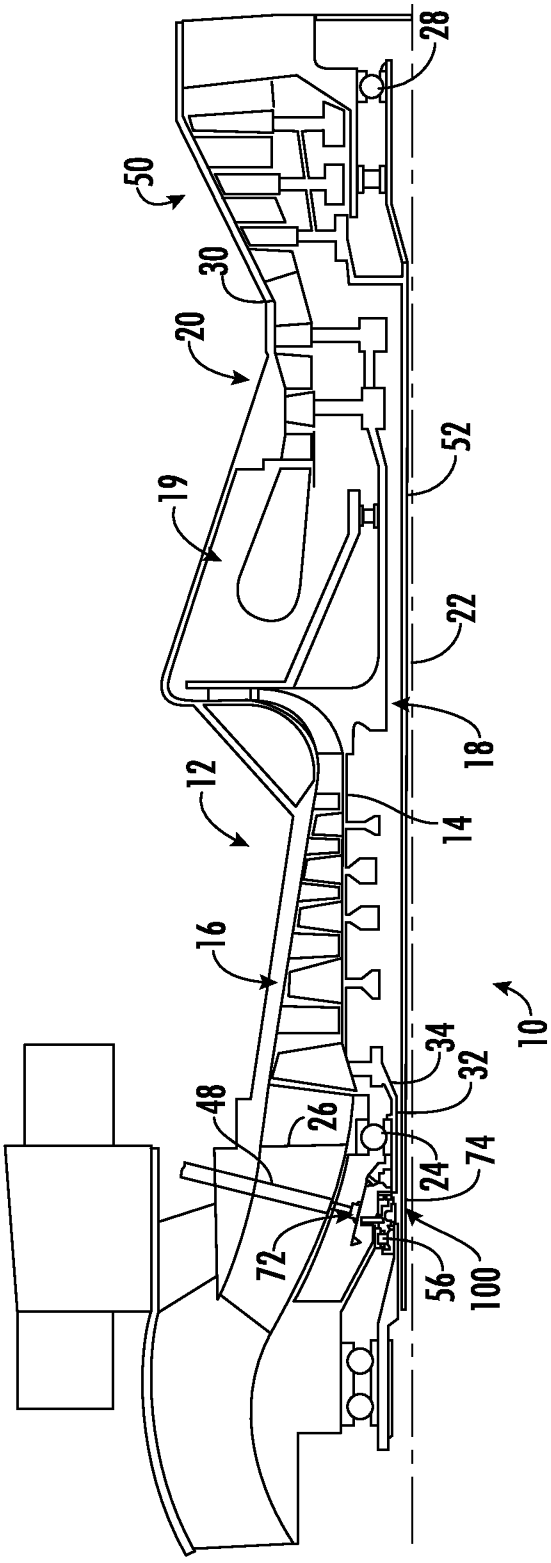
FIG. 1 illustrates a sectional view of an embodiment of a gas turbine engine having a seal assembly according to the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally directed to seal assemblies for rotary machines having at least one damping element. The seal assemblies according to embodiments of the present disclosure may be utilized in any rotary machine and, in particular, are suitable for rotary machines including turbomachines and gas turbine engines, and the like. In certain embodiments, the seal assemblies according to the present disclosure include aspirating seals that provide a thin film of pressurized fluid between a face of a seal and a face of a rotor. The thin film of fluid may be provided by one or more aspiration conduits (for example, high-pressure aspiration conduits) that allow fluid, such as pressurized air or gasses within a turbine engine, to flow from a higher-pressure region on one side of the seal assembly to a lower-pressure region on another side of the seal assembly. In other embodiments, the fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, an aerodynamic bearing or a combination of aerostatic and aerodynamic features referred to as a hybrid bearing, or the like.

As such, seal assemblies according to embodiments of the present disclosure are generally considered to be non-contacting seals, in that the fluid bearing generally inhibits contact between the seal face and the rotor face. In particular, the seal assemblies of the present disclosure generally include a primary seal defined by a rotor face of a seal rotor and a slider face of a seal slider. The primary seal may be configured as an aspirating face seal ring, a fluid bearing, a gas bearing, or the like. In addition, or in the alternative, the primary seal may be configured as a radial film riding seal, an axial film riding seal, a radial carbon seal, an axial carbon seal, or the like.

However, for such seals, it can be difficult to design a seal where the center of fluid pressure always passes through the geometrical center of the seal. Therefore, there is usually a pressure moment coupling between radial and axial vibrations of the seal. The presence of radial vibrations of the stator can cause significant reduction in the axial gap between the rotor and the seal, including catastrophic rubs. High seal response amplitude also adds to wear at interfaces, that limits the useful life of the seal. Under high vibration, stalls, and/or high thermal gradients, the non-contacting components can come into contact with each other, thereby causing metal-to-metal rubs and/or seal wear. This contact may change the seal force balance and may also cause the seal to run tighter, which causes more wear.

Accordingly, the present disclosure is generally directed to seal assemblies for rotary machines having at least one damping element. In certain embodiments, for example, the present disclosure is generally directed to seal assemblies that introduce tuned mass damper elements into the design of the face seal ring. In particular, in an embodiment, seal assemblies of the present disclosure include features on the seal slider of the face seal ring to accommodate circumferential mass segments, as well as spring and damper elements. Further, in an embodiment, the spring and damping elements are both in axial and radial directions. Various embodiments of spring elements may be utilized, including but not limited to leaf springs, helical springs, flexures created in-place using wire electrical discharge machining (EDM), etc. As such, in an embodiment, the damping elements allow the seal to remain centered in the radial direction. Isolating the seal from radial vibrations leads to reliable, rub-free operation of the seal in the presence of significant radial vibrations of the stator.

Moreover, in an embodiment, the seal assemblies of the present disclosure operate by addition of as little as about 5% to about 10% additional mass on the seal slider. Additionally, in an embodiment, a damping parameter is defined and selected in a range (e.g., from about 0.1 to about 0.7) that allows two defined parameters: broadband frequency attenuation benefit and operating frequency amplification to be at most 0.5, simultaneously.

Figure 2:
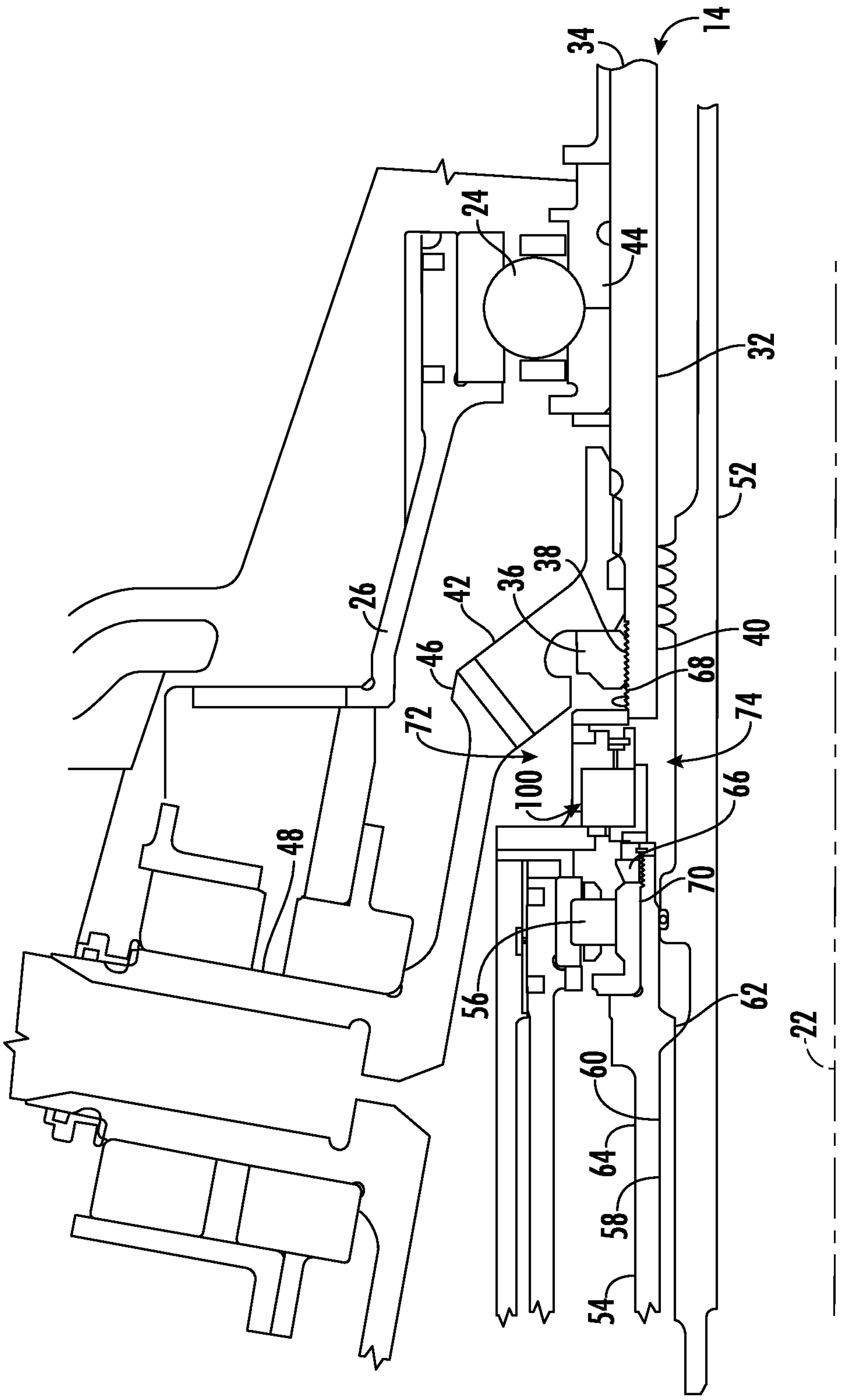
FIG. 2 illustrates an enlarged sectional view of the seal assembly of FIG. 1.

Referring now to the drawings, FIG. 1 illustrates a sectional view of an embodiment of a gas turbine engine having a seal assembly according to the present disclosure, and FIG. 2 illustrates an enlarged sectional view of the seal assembly of FIG. 1. In particular, as shown, the gas turbine engine 10 includes a high pressure gas generator 12 having a single stage centrifugal compressor 18 as a final compressor stage. The high pressure gas generator 12 has a high pressure rotor 14 including, in downstream flow relationship, a high pressure compressor 16, a combustor 19, and a high pressure turbine 20. The rotor 14 is rotatably supported about an engine centerline 22 by a first or forward bearing 24 in a front frame 26 and a rear bearing 28 disposed downstream of the high pressure turbine 20 in a turbine frame 30.

Referring to FIGS. 1 and 2, the gas turbine engine 10 further includes a stub shaft 32 located at a front end 34 of the rotor 14 to which it is connected. A high pressure locknut 36 is threaded on forward threads 38 on a forward end 40 of the stub shaft 32. The high pressure locknut 36 is used to tighten, secure, and clamp together and place in compression a horizontal bevel gear 42 and a ball bearing inner race 44 of the forward bearing 24 rotatably supporting the stub shaft 32. The horizontal bevel gear 42 drivingly engages a power take-off bevel gear 46 fixedly attached to a power take-off shaft 48.

Still referring to FIGS. 1 and 2, the gas turbine engine 10 also includes a low pressure turbine (LPT) 50 downstream of the high pressure turbine 20. Further, as shown, the gas turbine engine 10 is joined by a low pressure drive shaft 52 to a power output shaft 54 rotatably supported by an output shaft bearing 56.

As shown particularly in FIG. 2, the low pressure drive shaft 52 is located radially within and joined to the power output shaft 54 by a splined joint 58. Further, as shown, the splined joint 58 includes mating inner and outer splines 60, 62 extending radially outwardly and inwardly from the low pressure drive shaft 52 and the power output shaft 54, respectively. The splined joint 58 connects the low pressure drive shaft 52 to an aft end 64 of the power output shaft 54. An aft power shaft locknut 66 threaded on aft threads 68 on the aft end 64 of the power output shaft 54 is used to tighten, secure, and clamp together the power output shaft 54 and a roller bearing inner race 70 of the output shaft bearing 56.

Referring still to FIGS. 1 and 2, the gas turbine engine 10 also includes a shaft and seal assembly 72 that includes an annular seal assembly 100 which provides an air and/or oil seal between two shafts as described herein. The seal assembly 100 may also be used with other types of shafts in other applications and machinery. As shown, the stub shaft 32 radially surrounds and is concentric with the pressure drive shaft 52. In addition, as shown, the stub shaft 32 is spaced axially apart from and downstream or aft of the power output shaft 54. Moreover, as shown, an annular gap 74 extends axially between the stub shaft 32 and the power output shaft 54.

In an embodiment, as shown, the seal assembly 100 provides sealing across the annular gap 74. The seal assembly 100 may be used to provide sealing across the annular gap 74 between various types of axially spaced apart forward and aft shafts 52, 54 as illustrated in FIG. 3.

Figure 3:
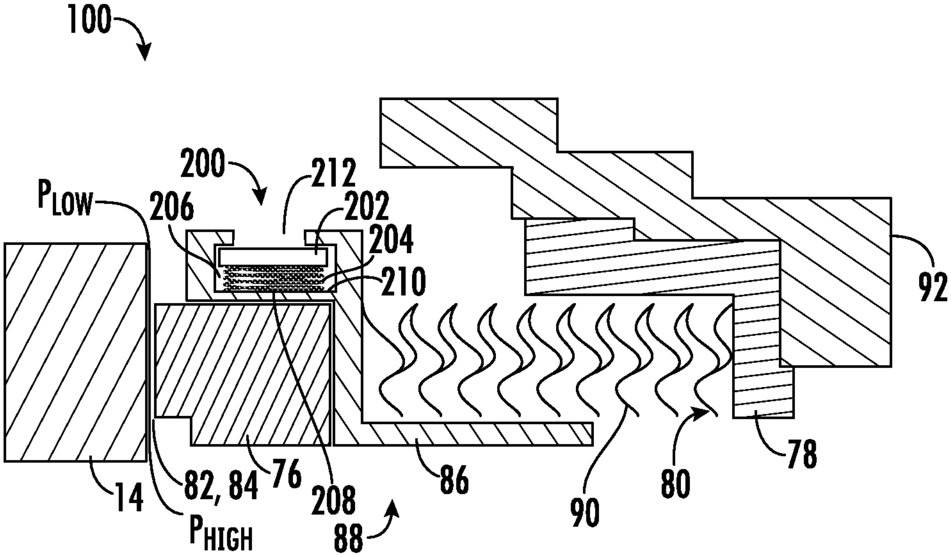
FIG. 3 illustrates a cross-sectional view of an embodiment of a seal assembly according to the present disclosure.

Referring now to FIG. 3, a partial cross-sectional view of an embodiment of the seal assembly 100 according to the present disclosure. Specifically, as shown, in an embodiment, the seal assembly 100 may include a carbon face seal ring 76 positioned with respect to a rotating component (e.g., the rotor 14) to form a sealing interface 82 therebetween that is configured to form a primary seal 84 of the seal assembly 100. Accordingly, the primary seal 84 is configured to reduce or block leakage a working fluid from a high-pressure upstream region $P_{HIGH}$ to a low-pressure region downstream region $P_{LOW}$. Further, as shown, the seal assembly 100 includes a non-rotating component 88 that includes a ring carrier 86 secured to the carbon face seal ring 76. The ring carrier 86 may be an integral part of the carbon face seal ring 76 or could be a service-friendly separated component coupled to the carbon face seal ring 76. Furthermore, the ring carrier 86 is secured to the carbon face seal ring 76 of the gas turbine engine 10 through mechanical assembling, such as via brazing, welding, mechanical fasteners friction fits, threading, or any other retaining mechanisms.

Furthermore, the seal assembly 100 includes a secondary seal 80, also referred to herein as a joint, disposed at an interface between the ring carrier 86 and a stator 78 mounted to an engine frame attachment 92. In such embodiments, the secondary seal/joint 80 is capable of linear and tilt displacement to allow the stator 78 to displace with respect to the rotor 14. In particular, as shown, the secondary seal 80 includes a bellow 90 or annular seal that is capable of compressing and expanding to allow the ring carrier 86 to translate axially with respect to the stator 78. In this manner, the ring carrier 86 (and thus the carbon face seal ring 76) may be biased toward the rotor 14 to seal the sealing interface 82.

With the secondary seal 80 in place, leakage between the ring carrier 86 and the stator 78 is limited, meanwhile allowing the ring carrier 86 to move axially away or toward the rotor 14 to accommodate any rotor translation in the axial direction due to different thermal expansion of the various components, or due to thrust reversal. The diameter of the secondary seal 80, or conventionally called pressure-balance diameter, is selected to control a closing force of the ring carrier 86.

In particular embodiments, as the rotor 14 spins with respect to the non-rotating component 88, a circumferential gradient in the film thickness (e.g., the gap between the carbon face seal ring 76 and the rotor 14) is created to generate hydrodynamic pressure at the sealing interface 82. Hence, a separation force prevents the carbon face seal ring 76 from contacting the rotor 14 during motion. This happens when the hydrodynamic opening force is larger than the net closing force created by external pressure acting on the ring carrier 86 and by the bellow 90.

Figure 4:
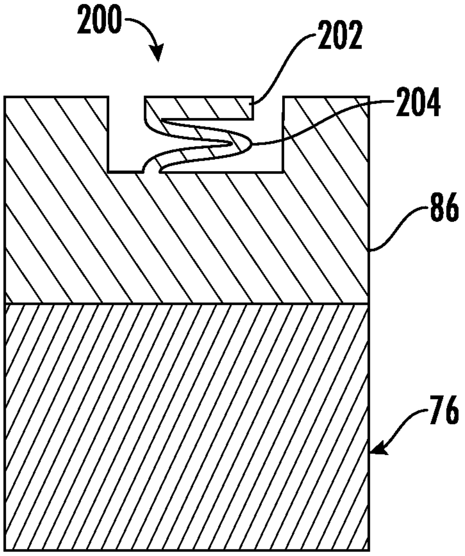
FIG. 4 illustrates a partial, perspective view of an embodiment of a sealing interface between a rotor ring and a stator slider of a seal assembly according to the present disclosure.
Figure 5A:
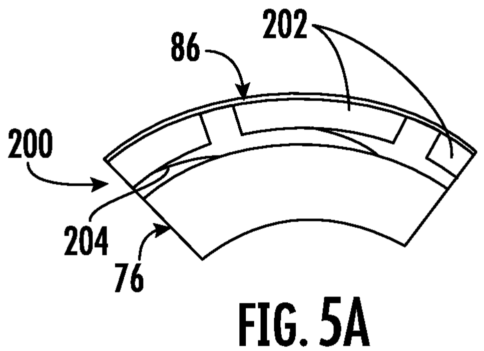
FIGS. 5A and 5B illustrate partial, front views of an embodiment of a plurality of damping elements for a seal assembly according to the present disclosure.
Figure 5B:
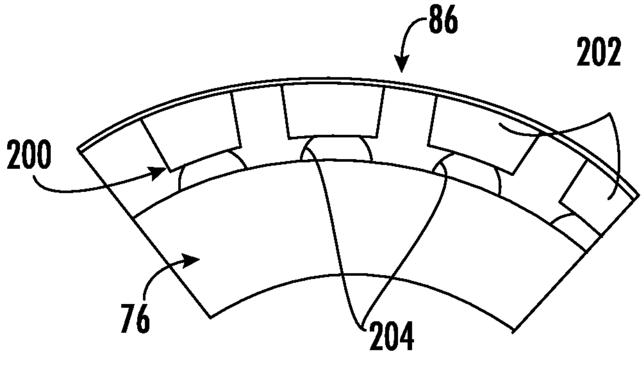

Referring now particularly to FIGS. 3-13, various views of embodiments of the seal assembly 100 having at least one damping element 200 according to the present disclosure are illustrated. In an embodiment, as shown in FIGS. 4-5B, the damping element(s) 200 described herein may include a plurality of damping elements 200 arranged circumferentially around the ring carrier 86, e.g., on top of the carbon face seal ring 76. Accordingly, in an embodiment, the plurality of damping elements 200 may extend in both axial and radial directions.

In an embodiment, as shown, the damping element(s) 200 further includes at least one mass element 202. For example, in an embodiment, the mass element(s) 202 of the damping element(s) 200 described herein may increase a total mass of the non-rotating component 88 by about 5% to about 10%. In further embodiments, the total mass of the non-rotating component 88 may be increased by less than 5% or more than 10%. More specifically, as shown in the embodiments of FIGS. 3, 5A-7, and 10-11, the damping element(s) 200 may be a tuned mass damper having at least one spring element 204 attached to the mass element 202. In particular, FIG. 3 illustrates the damping element(s) 200 configured as a tuned mass damper for the carbon face seal ring 76.

Figure 10:
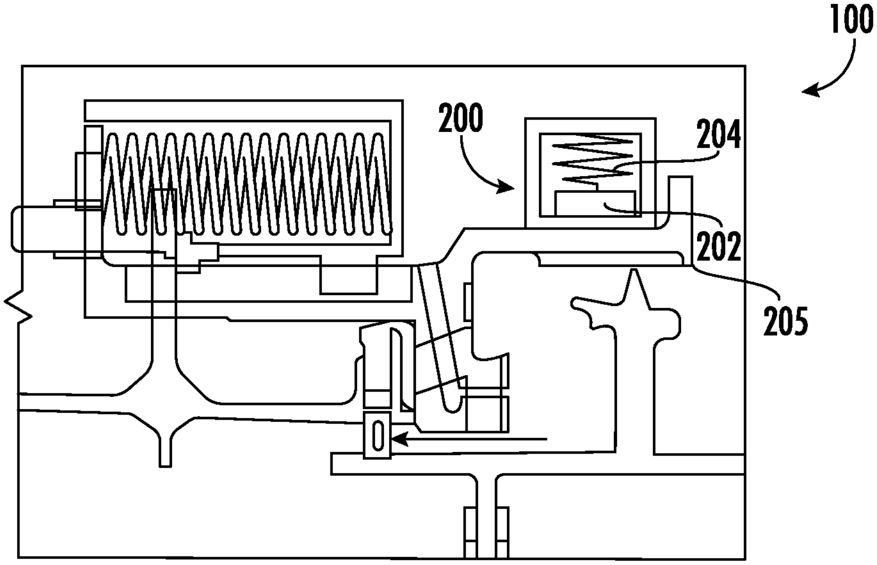
FIG. 10 illustrates a partial cross-sectional view of a seal assembly of a turbomachine, particularly illustrating an embodiment of a damping element of the seal assembly.
Figure 11:
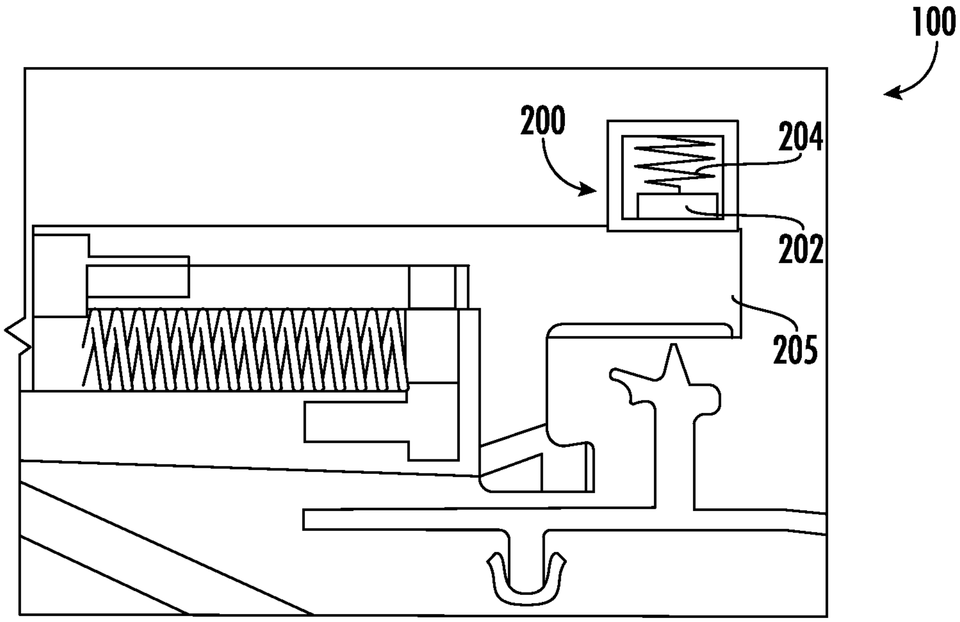
FIG. 11 illustrates a partial cross-sectional view of a seal assembly of a turbomachine, particularly illustrating an embodiment of a damping element of the seal assembly.

FIGS. 10 and 11 each provide a partial cross-sectional view of a seal assembly of a turbomachine, particularly illustrating various embodiments of a damping element of the seal assembly. In particular, FIG. 10 illustrates the damping element(s) 200 configured as a tuned mass damper mounted on a carrier/slider 205 of a first configuration of a hybrid face seal ring. Furthermore, FIG. 11 illustrates the damping element(s) 200 configured as a tuned mass damper mounted on a carrier/slider 205 of a second configuration of a hybrid face seal ring. Thus, the damping element(s) described herein can be applied to various types of seal assemblies.

For example, in an embodiment, as shown particularly in FIG. 3, the spring element 204 and the mass element 202 may be disposed in a recess 206 formed in a radially exterior surface of the ring carrier 86. Thus, as shown, in an embodiment, a first end 208 of the spring element 204 may be mounted or otherwise secured to a first surface 210 of the recess 206 with the mass element 202 being sized larger than an opening 212 of the recess 206 such that movement of the damping element(s) 200 is restricted by the recess 206. Moreover, in an embodiment, the mass element(s) 202 of the damping element(s) 200 may be any suitable mass or weight in addition to or other than a tuned mass damper.

Figure 6:
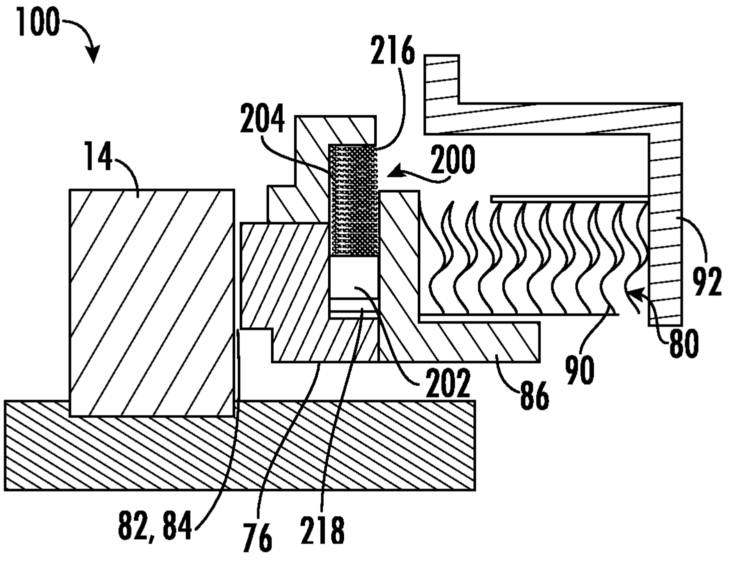
FIG. 6 illustrates a partial cross-sectional view of a seal assembly of a turbomachine, particularly illustrating an embodiment of a damping element of the seal assembly.
Figure 7:
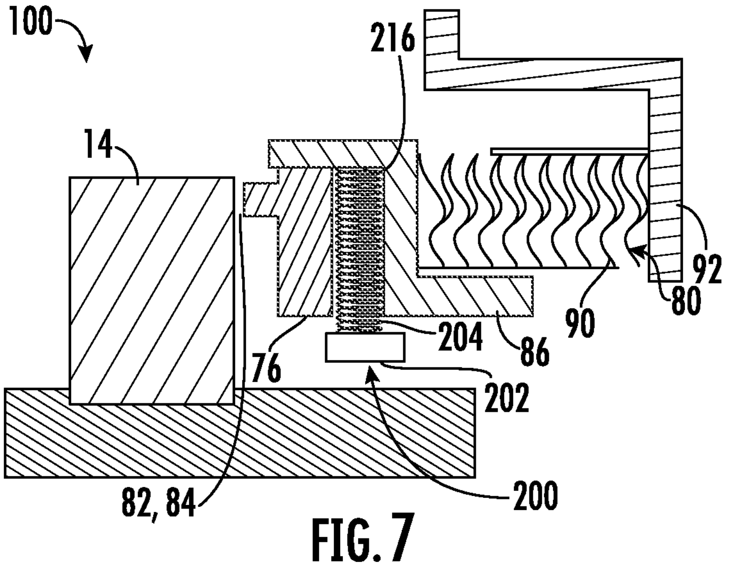
FIG. 7 illustrates a partial cross-sectional view of a seal assembly of a turbomachine, particularly illustrating an embodiment of a damping element of the seal assembly.

In further embodiments, the spring element(s) 204 may be any suitable type of spring formed using a variety of techniques. For example, as shown in FIG. 4, a cross-sectional view of an embodiment of the damping element 200 is illustrated, as viewed looking into the rotor 14 towards the carbon face seal ring 76. In particular, as shown, rather than the mass element 202 and the spring element 204 being separate components secured to the ring carrier 86, the damping element 200 may be formed integrally with the ring carrier 86. For example, in an embodiment, the damping element 200 may be formed integrally with the ring carrier 86 using an additive manufacturing process, such as an electrical discharge machining (EDM) process. Accordingly, it should be understood that the spring element(s) 204 described herein can be any suitable type of spring or similar. For example, as generally shown in FIGS. 3, 6, and 7, the spring element(s) 204 may be a helical spring. In other embodiments, as shown in FIGS. 5A and 5B, for example, the spring element(s) 204 may be a leaf spring.

Referring now to FIGS. 6 and 7, schematic diagrams of further embodiments of the seal assembly 100 according to the present disclosure are illustrated. In particular, as shown in FIG. 6, the spring element(s) 204 described herein may extend from a surface 216 of the ring carrier 86 radially inward and into a recess 218 formed between the carbon face seal ring 76 and the ring carrier 86. In certain embodiments, the recess 218 may contain a fluid. Moreover, as shown in FIG. 7, in an embodiment, the spring element(s) 204 described herein may extend from the surface 216 of the ring carrier 86 radially inward and between the carbon face seal ring 76 and the ring carrier 86.

Figure 8A:
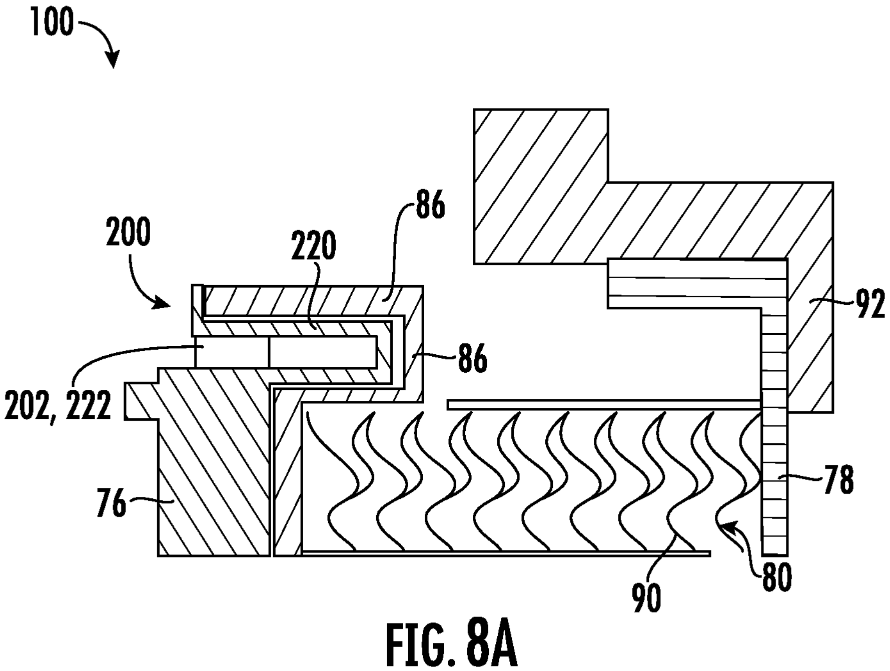
FIGS. 8A and 8B illustrate schematic views of various components of a seal assembly of a turbomachine, particularly illustrating an embodiment of a damping element of the seal assembly.
Figure 8B:
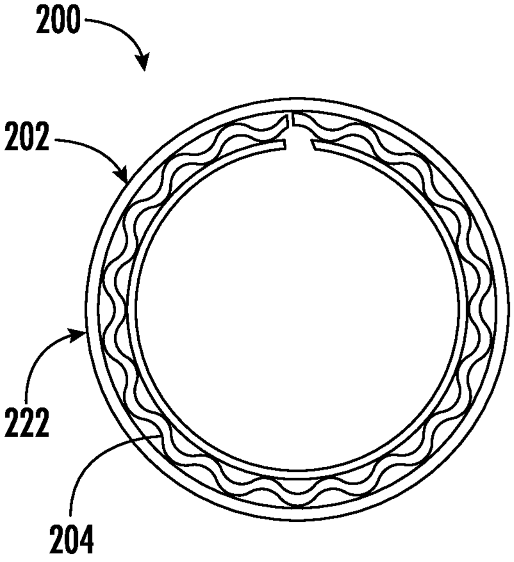
Figure 9A:
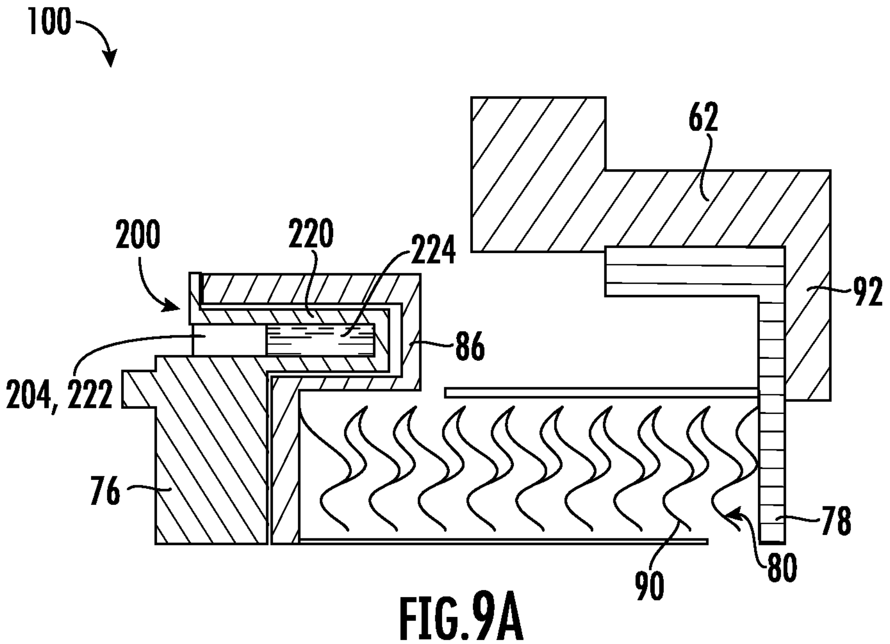
FIGS. 9A and 9B illustrate schematic views of various components of a seal assembly of a turbomachine, particularly illustrating another embodiment of a damping element of the seal assembly.
Figure 9B:
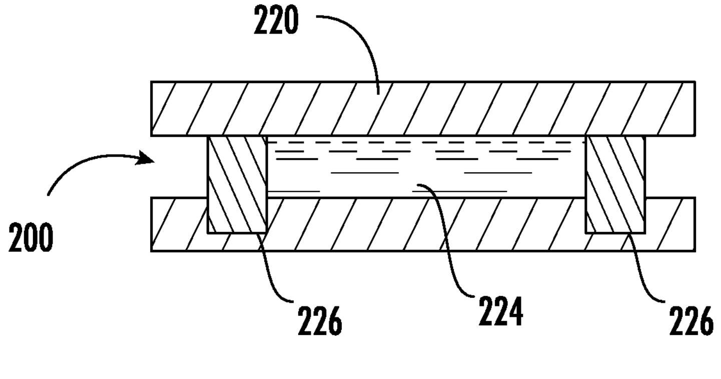

Referring now to FIGS. 8A-9B, schematic diagrams of further embodiments of the seal assembly 100 with the damping element(s) 200 described herein according to the present disclosure are illustrated. In particular, as shown in FIGS. 8A and 9A, the damping element(s) 200 may include a flexible hairpin carrier 220. Thus, in an embodiment, as shown in FIGS. 8A and 8B, the mass element(s) 202 may be a radial foil damper 222 supported by the spring element 204 arranged within the flexible hairpin carrier 220. In such embodiments, the radial foil damper 222 may be sandwiched inside the ring carrier 86 as shown. Thus, high frequency vibration of the seal assembly 100 causes relative motion between the inner diameter (ID) and the outer diameter (OD) of the radial foil damper 222. This causes sliding between the spring element 204 and the ID/OD, which dissipates energy due to friction. Moreover, as shown in FIGS. 9A and 9B, the mass element(s) may be a fluid 224 restricted by a plurality of seal members 226 (such as piston rings or O-rings) arranged within the flexible hairpin carrier 220.

Figure 12A:
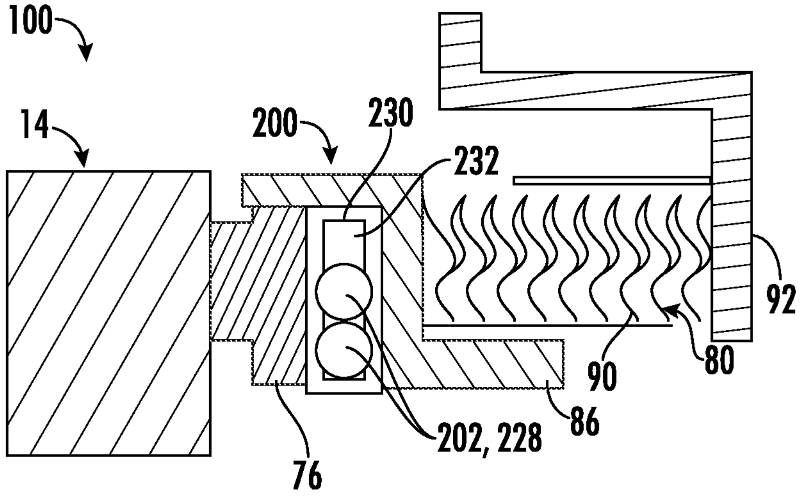
FIGS. 12A and 12B illustrate schematic views of various components a seal assembly of a turbomachine, particularly illustrating yet another embodiment of a damping element of the seal assembly.
Figure 12B:
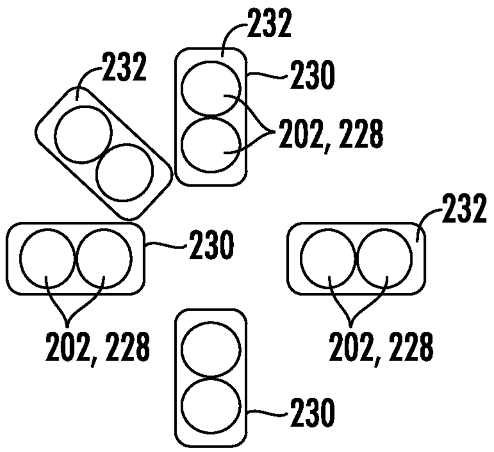

Referring now to FIGS. 12A and 12B, schematic diagrams of still further embodiments of the seal assembly 100 with the damping element(s) 200 described herein according to the present disclosure are illustrated. In particular, as shown, the mass element(s) 202 of the damping element(s) 200 described herein may include one or more mass balls 228 moveably arranged in one or more channels 230 containing a viscous fluid 232. In such embodiments, the ball(s) 228 are allowed move or slide within respective channels 230 but movement is mitigated by the viscous fluid 232 to provide the desired damping. Such damping element(s) 200 can thus be secured to the ring carrier 86, e.g., between the ring carrier 86 and the carbon face seal ring 76. Furthermore, as shown particularly in FIG. 12B, a plurality of the damping elements 200 may be arranged circumferentially around the ring carrier 86 in any suitable pattern and may be spaced evenly or unevenly around the ring carrier 86.

Figure 13:
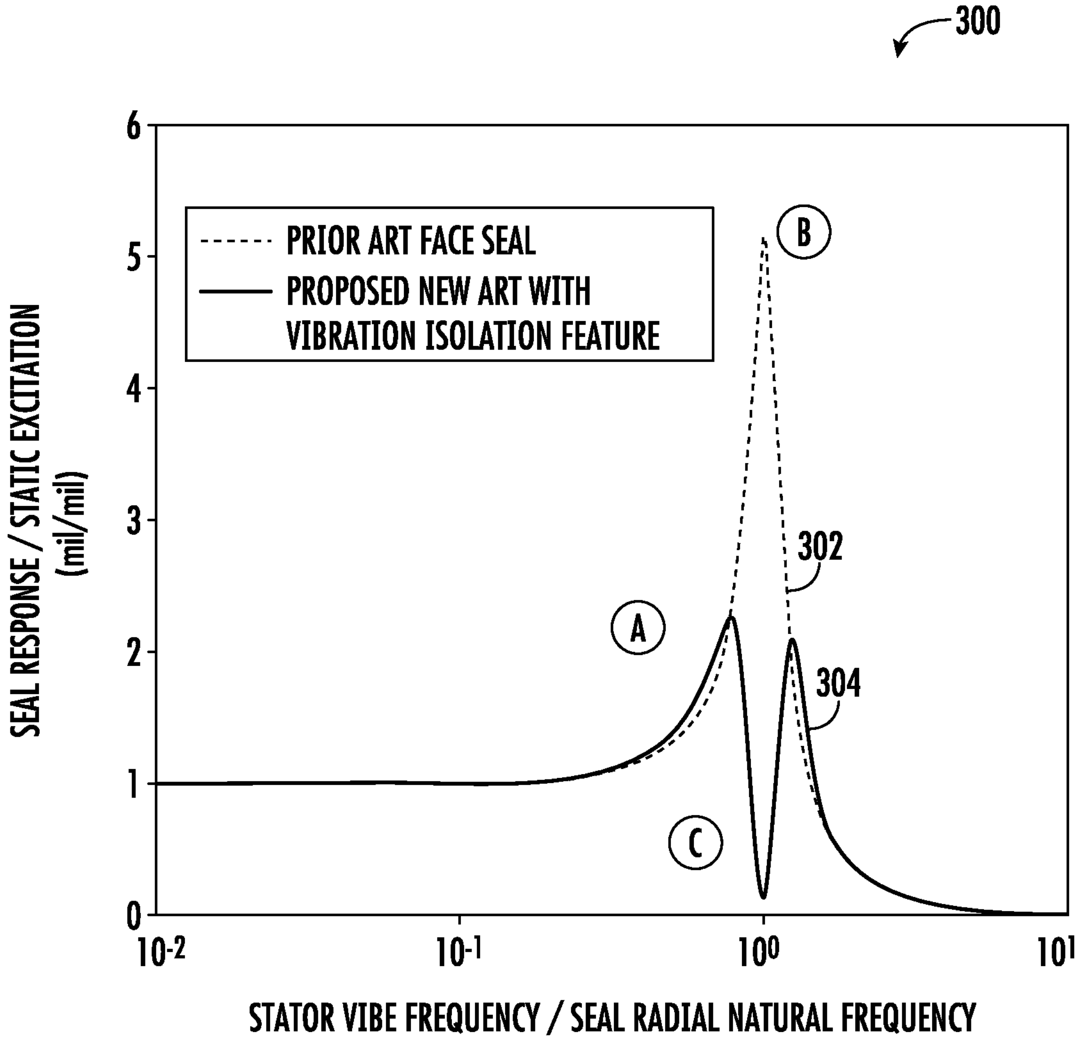
FIG. 13 illustrates a graph of a seal response/stator excitation (y-axis) versus stator vibe frequency/seal radial natural frequency (x-axis) according to the present disclosure.
Figure 14:
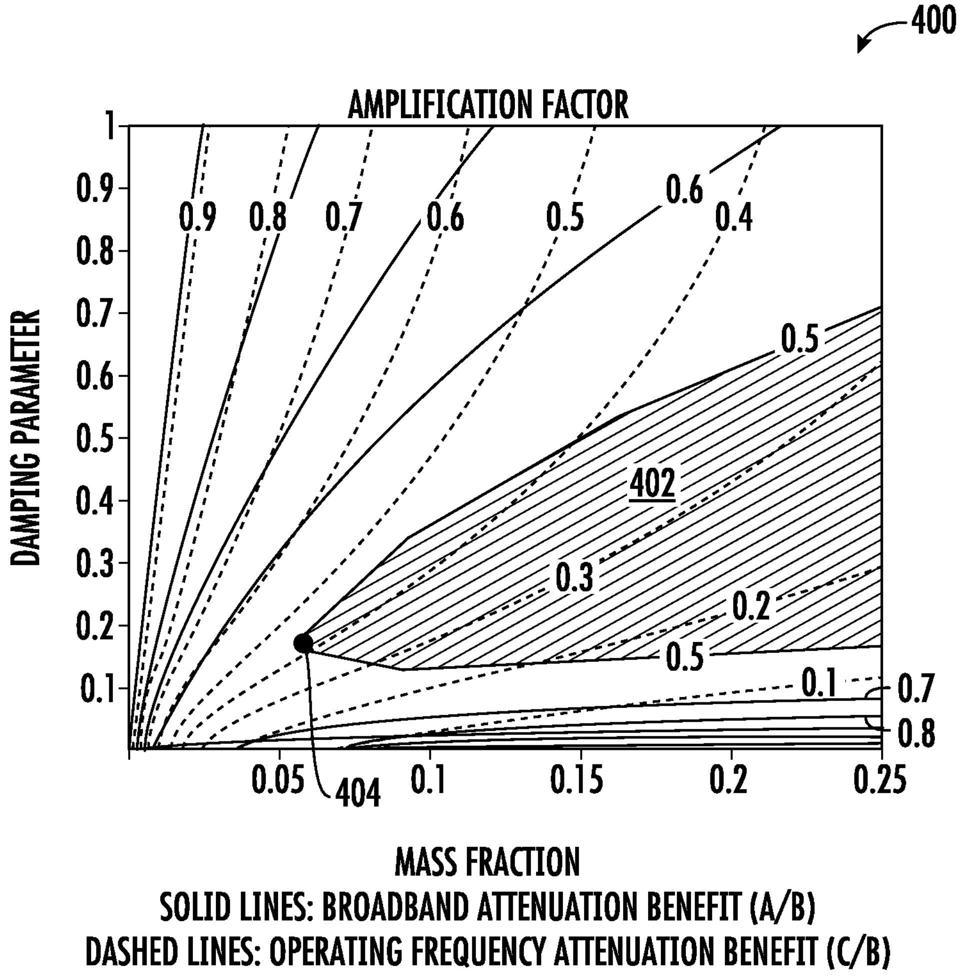
FIG. 14 illustrates an embodiment of a graph of a damping parameter represented as $c_a/(2\sqrt{(m_a k_a)})$ (y-axis) versus mass fraction (x-axis) according to embodiments of the present disclosure.

Referring now to FIGS. 13 and 14, various graphs are illustrated depicting advantages of the present disclosure. In particular, FIG. 13 illustrates a graph 300 of a seal response/stator excitation (mil/mil) y-axis) versus stator vibe frequency/seal radial natural frequency (x-axis) according to the present disclosure, whereas FIG. 14 illustrates a graph 400 of a damping parameter represented as $c_a/(2\sqrt{(m_a k_a)}$ (y-axis) versus mass fraction (x-axis) according to embodiments of the present disclosure is illustrated, wherein $c_a$ is a damping constant of the damping element(s) 200 described herein, $m_a$ is the mass of the damping element(s) 200, and $k_a$ is the stiffness of the damping element(s) 200 described herein.

In particular, as shown in FIG. 13, points A, B and C are illustrated, wherein point B of curve 302 is the highest point of the response curve before applying the damping element(s) 200 of the present disclosure; point C of curve 304 is the point at the same x-axis value after applying the damping element(s) 200 of the present disclosure, and point A is the highest point on curve 304. Further, as shown in FIG. 14, the mass fraction of the mass element(s) 202 described herein may range from about 0.05 to about 0.25, whereas the damping parameter represented as $c_a/(2\sqrt{(m_a k_a)}$ may range from about 0.1 to about 0.7. Accordingly, in an embodiment, the damping parameter is defined and selected in a range (e.g., from about 0.1 to about 0.7) that allows two defined parameters: broadband frequency attenuation benefit (C/B from FIG. 13) and operating frequency amplification (A/B from FIG. 13) to be at most 0.5, simultaneously. In other words, as shown, the optimal combination of such parameters is represented by shaded region 402, with an optimal point 404 being the lowest mass fraction for 50% attenuation.

Further aspects are provided by the subject matter of the following clauses:

A seal assembly for a turbomachine, the seal assembly comprising: a rotating component; a non-rotating component comprising a ring carrier, a face seal ring, and a joint disposed between the ring carrier and the non-rotating component, the non-rotating component arranged with the rotating component at a sealing interface, the joint capable of linear and tilt displacement to allow the non-rotating component to displace with respect to the rotating component, the sealing interface defining a gap between the face seal ring and the rotating component; and at least one damping element arranged with the ring carrier for maintaining the seal assembly centrally in a radial direction in the turbomachine, the at least one damping element comprising at least one mass element.

The seal assembly of any preceding clause, wherein the at least one damping element comprises at least one tuned mass damper comprising at least one spring element attached to the at least one mass element.

The seal assembly of any preceding clause, wherein the at least one spring element and the at least one mass element of the at least one damping element are disposed in at least one recess formed in a radially exterior surface of the ring carrier.

The seal assembly of any preceding clause, wherein the at least one spring element extends from a surface of the ring carrier radially inward and into a recess formed between the face seal ring and the ring carrier.

The seal assembly of any preceding clause, wherein the at least one spring element extends from a surface of the ring carrier radially inward between the face seal ring and the ring carrier.

The seal assembly of any preceding clause, wherein the at least one spring element comprises at least one of a helical spring or a leaf spring.

The seal assembly of any preceding clause, wherein the at least one damping element is formed integrally with the ring carrier.

The seal assembly of any preceding clause, wherein the at least one damping element comprises a plurality of damping elements, the plurality of damping elements extending in both axial and radial directions.

The seal assembly of any preceding clause, wherein the at least one damping element further comprises a flexible hairpin carrier, the at least one mass element being a radial foil damper supported by the spring element and arranged within the flexible hairpin carrier.

The seal assembly of any preceding clause, wherein the at least one damping element further comprises a flexible hairpin carrier, the at least one mass element being a fluid restricted by a plurality of seal members arranged within the flexible hairpin carrier.

The seal assembly of any preceding clause, wherein the at least one mass element of the at least one damping element further comprises one or more mass balls moveably arranged in one or more channels containing a viscous fluid.

The seal assembly of any preceding clause, wherein the at least one mass element of the at least one damping element increases a total mass of the non-rotating component by about 5% to about 10%.

The seal assembly of any preceding clause, wherein a mass fraction of the at least one mass element of the at least one damping element ranges from about 0.05 to about 0.25 and a damping parameter represented as $c_a/(2\sqrt{(m_a k_a)}$ ranges from about 0.1 to about 0.7 to provide an optimal combination of a broadband amplification and an operating frequency amplification less than 0.5.

The seal assembly of any preceding clause, wherein the seal assembly is configured as at least one of a carbon face seal ring, an aspirating face seal ring, a hybrid face seal ring, a fluid bearing, a gas bearing, or a film riding seal.

A turbomachine, comprising: a rotor; a stator arranged with the rotor at a sealing interface; and a seal assembly at the sealing interface, the seal assembly comprising: a ring carrier; a face seal ring; and a joint disposed between the ring carrier and the non-rotating component, the joint capable of linear and tilt displacement to allow the stator to displace with respect to the rotor, the sealing interface defining a gap between the face seal ring and the rotor; and at least one damping element arranged with the ring carrier for maintaining the seal assembly centrally in a radial direction in the turbomachine, the at least one damping element comprising at least one mass element.

The turbomachine of any preceding clause, wherein the at least one damping element comprises at least one tuned mass damper comprising at least one spring element attached to the at least one mass element.

The turbomachine of any preceding clause, wherein the at least one spring element and the at least one mass element of the at least one damping element are disposed in at least one recess formed in a radially exterior surface of the ring carrier.

The turbomachine of any preceding clause, wherein the at least one spring element extends from a surface of the ring carrier radially inward and into a recess formed between the face seal ring and the ring carrier.

The turbomachine of any preceding clause, wherein the at least one spring element extends from a surface of the ring carrier radially inward between the face seal ring and the ring carrier.

The turbomachine of any preceding clause, wherein the at least one spring element comprises at least one of a helical spring or a leaf spring.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A seal assembly for a turbomachine, the seal assembly comprising:

a rotating component;

a non-rotating component comprising:

a face seal ring arranged with the rotating component at a sealing interface, the sealing interface defining a gap between the face seal ring and the rotating component;

a ring carrier coupled to the face seal ring, the ring carrier forming a recess;

a joint attached to the ring carrier, the joint being capable of linear and tilt displacement to allow the non-rotating component to displace with respect to the rotating component; and at least one damping element for maintaining the seal assembly centrally in a radial direction in the turbomachine, the at least one damping element comprising at least one mass element and at least one spring element attached to the mass element, wherein the at least one mass element and the at least one spring element are disposed in the recess of the ring carrier.

2. The seal assembly of claim 1, wherein the recess is formed in a radially exterior surface of the ring carrier, and the at least one spring element and the at least one mass element of the at least one damping element are disposed in the recess.

3. The seal assembly of claim 1, wherein the recess is formed between the face seal ring and the ring carrier, and the at least one spring element extends from a surface of the ring carrier radially inward into the recess.

4. The seal assembly of claim 1, wherein the at least one spring element extends from a surface of the ring carrier radially inward between the face seal ring and the ring carrier.

5. The seal assembly of claim 1, wherein the at least one spring element comprises at least one of a helical spring or a leaf spring.

6. The seal assembly of claim 1, wherein the at least one damping element is formed integrally with the ring carrier.

7. The seal assembly of claim 1, wherein the at least one damping element comprises a plurality of damping elements, the plurality of damping elements extending in both axial and radial directions.

8. The seal assembly of claim 1, wherein the at least one damping element further comprises a flexible hairpin carrier, the at least one mass element being a radial foil damper supported by the spring element and arranged within the flexible hairpin carrier.

9. The seal assembly of claim 1, wherein the at least one damping element further comprises a flexible hairpin carrier, the at least one mass element being a fluid restricted by a plurality of seal members arranged within the flexible hairpin carrier.

10. The seal assembly of claim 1, wherein the at least one mass element of the at least one damping element further comprises one or more mass balls moveably arranged in one or more channels containing a viscous fluid.

11. The seal assembly of claim 1, wherein the at least one mass element of the at least one damping element increases a total mass of the non-rotating component by about 5% to about 10%.

12. The seal assembly of claim 1, wherein a mass fraction of the at least one mass element of the at least one damping element ranges from about 0.05 to about 0.25 and a damping parameter represented as $c_a/(2\sqrt{(m_a k_a)})$ ranges from about 0.1 to about 0.7 to provide an optimal combination of a broadband amplification and an operating frequency amplification less than 0.5.

13. The seal assembly of claim 1, wherein the seal assembly is configured as at least one of a carbon face seal ring, an aspirating face seal ring, a hybrid face seal ring, a fluid bearing, a gas bearing, or a film riding seal.

14. A turbomachine comprising:

one or more turbines that generate a torque output;

a rotor driven by the torque output;

a stator arranged with the rotor at a sealing interface; and a seal assembly at the sealing interface, the seal assembly comprising:

a ring carrier forming a recess;

a face seal ring, the sealing interface defining a gap between the face seal ring and the rotor; and a joint coupled between the stator and the ring carrier, the joint capable of linear and tilt displacement to allow the seal assembly to displace with respect to the rotor; and at least one damping element for maintaining the seal assembly centrally in a radial direction in the turbomachine, the at least one damping element comprising at least one mass element and at least one spring element attached to the mass element, wherein the at least one mass element and the at least one spring element are disposed in the recess of the ring carrier.

15. The turbomachine of claim 14, wherein the recess is formed in a radially exterior surface of the ring carrier, and the at least one spring element and the at least one mass element of the at least one damping element are disposed in the recess.

16. The turbomachine of claim 14, wherein the recess is formed between the face seal ring and the ring carrier, and the at least one spring element extends from a surface of the ring carrier radially inward into the recess.

17. The turbomachine of claim 14, wherein the at least one spring element extends from a surface of the ring carrier radially inward between the face seal ring and the ring carrier.

18. The turbomachine of claim 14, wherein the at least one spring element comprises at least one of a helical spring or a leaf spring.

19. The turbomachine of claim 14, wherein the at least one damping element is formed integrally with the ring carrier.

20. The turbomachine of claim 14, wherein the at least one damping element comprises a plurality of damping elements, the plurality of damping elements extending in both axial and radial directions.

* * * * *